(12) United States Patent
Fukushima et al.

(10) Patent No.: US 8,834,950 B2
(45) Date of Patent: Sep. 16, 2014

(54) METHOD FOR INHIBITING THE DETERIORATION OF EATING-QUALITY CHARACTERISTICS OF FOODS CONTAINING GELATINIZED STARCH

(75) Inventors: Hideki Fukushima, Okayama (JP);
Takashi Ohtsuki, Okayama (JP);
Naohiko Katagiri, Okayama (JP);
Toshio Miyake, Okayama (JP)

(73) Assignee: Hayashibara Co., Ltd., Okayama (JP)

( * ) Notice: Subject to any disclaimer, the term of this patent is extended or adjusted under 35 U.S.C. 154(b) by 377 days.

(21) Appl. No.: 12/302,454

(22) PCT Filed: May 22, 2007

(86) PCT No.: PCT/JP2007/060456
§ 371 (c)(1),
(2), (4) Date: Nov. 25, 2008

(87) PCT Pub. No.: WO2007/138934
PCT Pub. Date: Dec. 6, 2007

(65) Prior Publication Data
US 2009/0186140 A1    Jul. 23, 2009

(30) Foreign Application Priority Data
May 25, 2006 (JP) ................... 2006-144762

(51) Int. Cl.
*A23L 1/05* (2006.01)
*A47J 39/00* (2006.01)
*A23G 3/00* (2006.01)
*A23L 1/0522* (2006.01)
*A23L 1/20* (2006.01)
*A23L 3/3562* (2006.01)
*A23L 1/10* (2006.01)
*A23L 1/16* (2006.01)
*A23L 1/182* (2006.01)
*A23L 1/09* (2006.01)

(52) U.S. Cl.
CPC ... *A23L 1/16* (2013.01); *A23L 1/20* (2013.01); *A23L 3/3562* (2013.01); *A23L 1/10* (2013.01); *A23L 1/182* (2013.01); *A23L 1/0522* (2013.01); *A23L 1/09* (2013.01)
USPC ............ 426/573; 426/520; 426/658; 426/508

(58) Field of Classification Search
USPC .................. 426/508, 658, 573, 520
See application file for complete search history.

(56) References Cited

U.S. PATENT DOCUMENTS

| 4,735,812 | A | | 4/1988 | Bryson et al. | |
|---|---|---|---|---|---|
| 5,538,883 | A | * | 7/1996 | Nishimoto et al. | 435/200 |
| 7,534,458 | B2 | * | 5/2009 | Sadakiyo et al. | 426/463 |

FOREIGN PATENT DOCUMENTS

| EP | 0 983 727 A2 | | 3/2000 | |
|---|---|---|---|---|
| JP | 06141797 A | * | 5/1994 | |
| JP | 08173065 A | * | 7/1996 | |
| JP | 09-220061 | * | 8/1997 | |
| JP | 2003-125718 | * | 7/2003 | ............ A23L 1/10 |
| JP | 2003225059 A | * | 8/2003 | |

OTHER PUBLICATIONS

Machine translation of JP09-220061 (1997).*
Machine translation of JP2003-125718 (2003).*
NPL Rice Gelatinization, Thesis by Amornsin, A from University of Georgia, 1999.*
Supplementary European Search Report of EP 07 74 3890 A2 dated Jul. 5, 2011.
Wikipedia, Caramelization, http://en.wikipedia.org/wiki/Caramelization, Feb. 14, 2013.

* cited by examiner

*Primary Examiner* — Humera Sheikh
*Assistant Examiner* — Bhaskar Mukhopadhyay
(74) *Attorney, Agent, or Firm* — Browdy and Neimark, PLLC

(57) ABSTRACT

An object of the present invention is to provide a method for inhibiting the deterioration of eating-quality characteristics of a food containing gelatinized starch and to keep their eating-quality characteristics as just prepared after a relatively prolonged storage under freezing, refrigerating, chilling or room temperature. The present invention achieves the above object by a method of permeating of maltose and/or α,α-trehalose or saccharides comprising the same and other oligosaccharides in a prescribed ratio into the above food containing gelatinized starch by admixing the saccharide to the food and holding them at relatively high temperature for a prescribed period.

5 Claims, No Drawings

METHOD FOR INHIBITING THE DETERIORATION OF EATING-QUALITY CHARACTERISTICS OF FOODS CONTAINING GELATINIZED STARCH

TECHNICAL FIELD

The present invention relates to a novel method for inhibiting the deterioration of eating-quality characteristics of foods containing gelatinized starch.

BACKGROUND ART

The variety of distribution in accordance with recent diversity of diet and lifestyle has diversified forms of foods containing gelatinized starch. In the case of rice diet such as "hakuhan" (plain cooked rice), "sekihan" (red-bean rice), "okowa" (steamed glutinous rice), "sushi" (vinegared rice diet), "ajituke-meshi" (seasoned rice), "onigiri" (rice ball), "ohagi" (bean cake), "mochi" (rice cake), and there processed food, noodles such as "udon" (Japanese wheat noodle), "soba" (buckwheat noodle), Chinese noodle, spaghetti, "gyoza" (Chinese steam-baked meat pie), "shumai" (Chinese steamed meat dumpling), the demand for them packaged for a one feed or in a retort pouch have grown with the practical distribution and storage under a room, refrigerated, chilled, or frozen temperature, and with the applicability to fuss-free home cooking.

However, because of the relatively high moisture content, foods containing gelatinized starch deteriorate in eating-quality characteristics with the increase of hardness and the decrease of stickiness resulting from retrogradation of the starch and the increase of unpleasant smells resulting from oxidized lipid according to the storage period.

Several methods for keeping the eating-quality characteristics of foods containing gelatinized starch are proposed using enzymes such as amylases, saccharides such as oligosaccharides or sugar alcohols thereof, surfactants such as sucrose-fatty acid esters or glycerol-fatty acid esters, proteins such as gelatin, and polysaccharides in the preparation process. However, the above methods still remain the following problem such as the insufficient keeping-effect for the eating-quality characteristics, the deterioration of characteristics such as flavor, color, or other properties of a rice diet, and the complicated process. Therefore, improvements in a preparation technology of foods containing gelatinized starch are desired to keep the eating-quality characteristics for a long time in accordance with their distribution.

Some methods with rectified above defects are proposed; such as a method for preparing noodles in which the cooking water, cooling water thereafter, or liquid preparation for the boiled noodle are admixed with saccharides (for example, Japanese Patent Kokai No. 196225/96), and for keeping the eating-quality characteristics of rice diets or the frozen ones by boiling with trehalose (for example, Japanese Patent Kokai Nos. 147916/95, 206006/97, 262581/98, and 116346/00). But in the case of foods containing gelatinized starch heated with trehalose, the saccharide may not sufficiently permeate into the foods resulting in uneven hardness or the following acceleration thereof by the inhibited gelatinization. Particularly, the softness of rice diets may not be kept when stored under chilled or refrigerated conditions. According to Japanese Paten Kokai 147916/95, the addition of trehalose to rice diets after cooked is not suitable because of the low dispersibility and insufficient effect.

DISCLOSURE OF INVENTION

An object of the present invention is to provide a method for inhibiting the deterioration of eating-quality characteristics of a food containing gelatinized starch and a food containing gelatinized starch with the inhibited deterioration of eating-quality characteristics prepared by the method.

The inventors of the present invention have dedicated themselves to research the methods using saccharides to achieve the above object. In consequence, it was found that the following method was quite effective to inhibit the deterioration of eating-quality characteristics of a food containing gelatinized starch; α,α-trehalose and/or maltose or the saccharide comprising the same and other oligosaccharide(s) (hereinafter, "other oligosaccharides" may mean oligosaccharides other than α,α-trehalose and maltose) in a certain amount were admixed to the food kept at 50 to 100° C. immediately after the starch-gelatinization to permeate into the food at 50° C. or more, preferably 60 to 100° C. for a prescribed period. The textures and tastes (hereinafter, these properties may collectively be couched in "eating-quality characteristics") of the food containing gelatinized starch were kept during distribution or storage under a room, refrigerated, chilled or frozen temperature by the above method. The application of the above method to a food preliminarily gelatinized with α,α-trehalose and/or maltose is more effective for inhibiting the deterioration of eating-quality characteristics than to a food gelatinized without addition of saccharides. It was found that odors of a stored food containing gelatinized starch and odors and tastes of a cooked long-stored rice can be repressed by the method; thus the present invention was accomplished. The present invention relates to a method of inhibiting the deterioration of eating-quality characteristics of a food containing gelatinized starch by admixing of α,α-trehalose and/or maltose or saccharides comprising the same and other oligosaccharide(s) in a certain amount to the food immediately after the starch-gelatinization to permeate the saccharides into the food by keeping at relatively high temperature for a prescribed period.

Since the deterioration of eating-quality characteristics of a food containing gelatinized starch prepared by the method of the present invention was inhibited when stored and distributed under a room, refrigerated, chilled, or frozen temperature, the good eating-quality characteristics of the food were kept as just prepared for a relatively long period.

BEST MODE FOR CARRYING OUT THE INVENTION

The foods containing gelatinized starch as referred to as in the present invention mean primary or secondary processed foods made of grains or cereal flours as the basic ingredients, such as grain foods including rice diet, or noodles or "gyuhi" (rice dumpling) made from cereal flours (hereinafter, they may be collectively described as "base cereal"), which is prepared by boiling or steaming to gelatinize the starch in the preparation process.

The grain foods as referred to as in the present invention mean foods made of grains such as rice, barley, wheat, rye, oat, buckwheat, barnyardgrass, or foxtail millet, especially a rice diet, in which these grains may be used alone or in combination. They are primary processed foods prepared by boiling or steaming of these grains or secondary processed foods made of the primary processed foods. The grain foods may contain other non-grain ingredients. For example, they include rice diets and noodles, which may be secondary-processed products packed into a small size for one feed or in a retort pouch to be applicable to the storage and distribution, and include also room-temperature foods, retort foods, refrigerated foods, frozen foods, and dried foods.

The rice diet as referred to as in the present invention means foods made of rice, such as "hakuhan" (plain cooked rice), "sekihan" (red-bean rice), "okowa" (steamed glutinous rice), "takikomi-gohan" (seasoned rice boiled with ingredients), "sushi-meshi" (vinegared rice), which include their secondary-processed products such as "onigiri" (rice ball), "ohagi" (bean cake), "sushi" (vinegared rice diet), and "mochi" (rice cake).

The rice for the rice diet as the subject for the preparation method of the present invention is not to be limited to the species or their growing areas as long as they belong to the genus *Oryza*. Any brand-name rice and both ordinary and glutinous rice are acceptable. For example, in the case of brand-name rice such as "koshihikari" or "sasanishiki" those are popular with their good eating-quality characteristics, the effect of the present invention for inhibiting the aged deterioration of eating-quality characteristics is easily exerted. The method of the present invention is more effective for low-quality rice or rice deteriorated by long storage. In the case of other grains, any kind or growing area thereof s acceptable.

The noodles as referred to as in the present invention are not restricted, including for example boiled noodles including "udon" (Japanese wheat noodle), "soba" (buckwheat noodle), Chinese noodles, spaghetti, macaroni, which are made of cereal flours, and prepared noodles added with ingredients.

As the saccharides of the present invention allowed to permeate into the foods containing gelatinized starch, less sweet saccharides with larger effects for antiretrogradation of the starch than equal portion of sucrose is preferred, and $\alpha,\alpha$-trehalose and/or maltose are more preferable. For the prolonged inhibition of the deterioration of eating-quality characteristics by enhanced permeation of the saccharides, less sweet saccharides are usable in addition to $\alpha,\alpha$-trehalose and/or maltose not to increase the sweetness. Concretely, maltooligosaccharides composed of two to seven monosaccharides or saccharides mainly consisting of them, which are less sweet than $\alpha,\alpha$-trehalose and/or maltose, for example, maltooligosaccharides such as maltotriose, maltotetraose, maltopentaose, saccharides comprising these saccharides such as syrups, sugar alcohols synthesized by hydrogenation of these saccharides, derivatives of $\alpha,\alpha$-trehalose such as $\alpha$-glucosyl $\alpha,\alpha$-trehalose, $\alpha$-maltosyl $\alpha,\alpha$-trehalose, $\alpha$-maltotriosyl $\alpha,\alpha$-trehalose, non-reducing cyclic saccharides such as cyclodextrins, cyclotetrasaccharides and derivatives thereof can be used. As long as a sufficient effect is obtained, the content of the amount of $\alpha,\alpha$-trehalose and/or maltose is not restricted. But in consideration of the keeping effect for the eating-quality characteristics and the deterioration therein caused by the sweetening, the above content is preferred to be 30% or more, preferably 30% to 70%, more preferably 35% to 70% on a dry solid basis. In the case of the content less than 30%, desired effects may not be obtained. For other oligosaccharides, maltooligosaccharides and saccharide-derivatives of $\alpha,\alpha$-trehalose are preferred. Maltotetraose, $\alpha$-maltosyl $\alpha,\alpha$-trehalose or saccharides mainly consisting of them are more preferred in respect of low sweetness, large effect of antiretrogradation, and low viscosity. In respect of low sweetness, maltotetraose and saccharides mainly consisting of it are much more preferable. In the case that the subject foods of the present invention such as "sushi-meshi" (vinegard rice), which are sweetened with sucrose, the amount of the above less sweet saccharides concomitantly used may be accordingly reduced.

In the present invention, the amount of $\alpha,\alpha$-trehalose and/or maltose or their mixture with other oligosaccharides permeating into a food containing gelatinized starch immediately after heat-gelatinization of the starch in the base cereal is not restricted as long as a sufficient effect is obtained. Usually, the amount of $\alpha,\alpha$-trehalose and/or maltose is preferred to be 2 to 25% by weight (hereinafter, "% (w/w)" is abbreviated as "%" unless specified noted), more preferably 5 to 15% of the base cereal on a dry solid basis. Sufficient effects may not be obtained in the case of the amount of the saccharides is 2% or less of the base cereal on a dry solid basis. In the case of the amount of saccharides is over 25% of the base cereal on a dry solid basis, the keeping of the softness is prolonged but the sweetness may increase, for example, "hakuhan" (plain cooked rice) may deteriorate in its eating-quality characteristics. On the other hand, the amount of the saccharides permeating into foods containing gelatinized starch such as "sushi-meshi" (vinegared rice), "takikomi-gohan" (seasoned rice boiled with ingredients), "udon"(Japanese wheat noodle), "soba" (buckwheat noodle), Chinese noodle, spaghetti, which are seasoned with vinegars or seasonings or poured with sauces or dressings, can be accordingly increased and the permeation of sweet saccharides such as sucrose along with a prescribed amount of $\alpha,\alpha$-trehalose and/or maltose is acceptable, as long as it does not affect their eating-quality characteristics. The above foods containing gelatinized starch can be produced by their usual cooking method such as boiling or steaming.

Furthermore, the method of the present invention is applicable to rice foods cooked with $\alpha,\alpha$-trehalose and/or its derivatives added to be collectively about 1 to 5%, preferably 2 to 4%, more preferably 3 to 4% by weight of the base cereal on a dry solid basis, or to noodles boiled in water containing $\alpha,\alpha$-trehalose and/or its derivatives at the concentration of collectively about 1 to 5%, preferably 2 to 4%, more preferably 3 to 4% on a dry solid basis, to further inhibit the deterioration of eating-quality characteristics. In the case that the noodles such as "udon" (Japanese wheat noodle), "soba" (buckwheat noodle), spaghetti, "gyoza" (Chinese steam-baked meat pie), and "shumai" (Chinese steamed meat dumpling), are prepared by containing $\alpha,\alpha$-trehalose and/or its derivatives at the concentration of collectively about 1 to 5%, preferably 2 to 4%, more preferably 3 to 4% by weight of the base cereal (flour), their deterioration of eating-quality characteristics are further inhibited. The method of the present invention is applicable to rice diets or noodles in which odors or taste arising during long storage at room or refrigerated temperature are inhibited by boiling in water of which pH is regulated in neutral or weakly alkaline, preferably in pH 7.0 to 7.5. Usually, one part by weight of rice was cooked with 1.1 to 1.5 parts, preferably 1.2 to 1.4 parts by weight of water. However, since the rices cooked with $\alpha,\alpha$-trehalose may become harder in the above conditions, the volume of water used for cooking them is increased by 1 to 5%, preferably 2 to 4% of the usual volume. Since a use of $\alpha,\alpha$-trehalose leads to increase in the amount of water added to the raw rice, the weight of the rice and the yielding percentage can be increased.

Along with the present invention, additives and seasonings which keep or improve eating-quality characteristics with different mechanisms from $\alpha,\alpha$-trehalose and/or maltose and other saccharides, such as food additive surfactants, enzymes, fats, sugars, vinegars, salts, "dashi" (soup), "shoyu" (soy sauce), "mirin" (sweet cooking rice wine) are usable to improve the eating-quality characteristics, gloss, viscosity, hardness or to flavor the foods containing gelatinized starch in addition to the above saccharides permeating into the foods. These additives and seasonings can be used in usual process.

In the case of preparation of "sushi-meshi" (vinegared rice), seasonings including vinegar can be added to the saccharide solution.

In the present invention, any method for allowing α,α-trehalose and/or maltose or saccharide comprising them and other saccharides by a prescribed ratio to permeate into a food containing gelatinized starch is acceptable as long as preferable effects are obtained with the sufficient admixing for permeation of the saccharides into the food. For example, there are method for the permeation of the saccharides such as direct dispersion of powdery or syrupy saccharides on a food containing gelatinized starch, coexistence and contact of the aqueous solution of the above saccharides with a food containing gelatinized starch, or soaking of a food containing gelatinized starch in the above solution. The required amount of saccharides can be added at once in whole, or in two or more additions. A method by using saccharides solution in relatively high temperature is preferable for admissible permeation into the food containing gelatinized starch in a simple way. Any concentration of the above saccharide solution can be used as long as preferable effects are obtained. Usually, the concentration of the amount of maltose and/or α,α-trehalose in the above solution is 45 to 80%, preferably 50 to 80%, more preferably 55 to 70%. A higher concentration of saccharides may cause problems in working properties caused by the reduced volume of the solution leading to nonhomogeneous mixture with rices and low permeability.

The ratio of maltose to α,α-trehalose is not restricted as long as sufficient effects are obtained. Maltose or α,α-trehalose can be used alone but the ratio is preferable to be 9:1 to 1:4, more preferably 4:1 to 3:7 for the sufficient effects of antiretrogradation of the starch and inhibition of hardening of the food containing gelatinized starch.

When the above saccaride solution is allowed to permeate into a food containing gelatinized starch immediately after gelaninization by admixing, the solution heated to about the same temperature as the food as just prepared can be allowed to permeate with stirring the food containing gelatinized starch. The temperature at which the saccharide permeate into a food containing gelatinized starch is not restricted as long as sufficient effects are obtained. Usually, it is over 50° C., preferably 60 to 100° C., more preferably 70 to 90° C. The saccharide permeations are assured by keeping the food containing gelatinized starch admixed with the saccharide solution at above temperature still or with stirring for a prescribed period. The above keeping period in a prescribed temperature is not restricted as long as the sufficient permeation of the saccharide into the food containing gelatinized starch is obtained. Usually, 5 minutes is necessary for good working properties, and preferably 10 to 180 minutes, more preferably 15 to 90 minutes, much more preferably 25 to 60 minutes are necessary. In the case that the temperature significantly decreases in above periods, use of a heat-retaining vessel or heating of the food containing gelatinized starch are applicable to keep it at relatively high temperature. A lower concentration of the saccharide leads to increase of stickiness or softness followed by deterioration of eating-quality characteristics of the food containing gelatinized starch. In the case of a food containing gelatinized starch prepared by steaming such as "okowa" (steamed glutinous rice), it can be admixed with the saccharide in a suitable vessel after steaming on the above condition. In any case described above, a food containing gelatinized starch is usually admixed with the saccharide under a normal pressure, but an increased or reduced pressure is acceptable. In the case of a food prepared by a process using "sushi-zu" (sweetened vinegar for "sushi" (vinegared rice diet)) or seasonings after the starci-gelatinization, the food can be admixed with a mixture of the saccharide solution and "sushi-zu" (sweetened vinegar for "sushi" (vinegared rice diet)) or seasonings at the above process and left for a prescribed period, or the above saccharide solution at a relatively high temperature can be advantageously used to permeate by admixing to the food.

As long as sufficient effects are obtained, the origin, preparation method, purity, form of α,α-trehalose and maltose and other oligosaccharide are not restricted. They may be compositions containing other saccharides co-produced in their preparation process, partially or highly purified products, or compositions containing other ingredients that do not inhibit the effects of the present invention. The saccharides can be prepared by fermentation, enzymatic method, or synthetic method, and are advantageously usable in forms of syrup, massecuite, amorphous powder, and powdery crystal containing molasses, powdery crystal. Commercially produced saccharides meeting above requirements can advantageously used.

The details of the present invention are explained by the following experiments.

Experiment 1

Effects of Saccharides on Deterioration of Eating-Quality Characteristics of Rice The following experiment was performed to investigate the effects of the saccharides on the deterioration of eating-quality characteristics of rice. Each of the following sugar; "GOLDSUGAR®" (a glucose product commercialized by Hayashibara Shoji, Inc.), "SUNMALT®" (a maltose product commercialized by Hayashibara Shoji, Inc.), "TREHA®" (an α,α-trehalose product commercialized by Hayashibara Shoji, Inc.), "MALTRUP®" (an enzymatically saccharified syrup commercialized by Hayashibara Shoji, Inc.), "TETRUP-H®" (a maltotetraose rich syrup commercialized by Hayashibara Shoji, Inc.), "powdery MABIT®" (a maltitol product commercialized by Hayashibara Shoji, Inc.), "HS-40®" (a highly-saccharified and hydrogenated syrup commercialized by Hayashibara Shoji, Inc.), "HS-20®" (a lowly-saccharified and hydrogenated syrup commercialized by Hayashibara Shoji, Inc.), "HALODEX®" (saccharide-derivative of α,α-trehalose (α-maltosyl α,α-trehalose) rich syrup commercialized by Hayashibara Shoji, Inc.), or sucrose (commercialized product), was dissolved in water by heating at 80° C. to give the saccharide solution at the concentration of 65%. One part of commercially available ordinary rice ("Sasanishiki" produced in 2004) was measured off and rinsed. It was added with 1.3 parts by weight of water and boiled after one-hour soak to produce a cooked rice in common procedure. After 10-minute steaming by the residual heat after cooking, the rice was admixed with one of the above saccharide solutions at the amount of 10% of the weight of the raw rice on a dry solid basis, and kept in keep-warm vessel at 85 to 80° C. for an hour to allow the saccharide to permeate into the rice. The rice was shaped into "onigiri" (rice ball) and stored at 4° C. after cooling. At 24, 36, and 48 hours after the storage, sensory evaluation tests of the "onigiri" (rice ball) was performed on the properties of retrogradation (mealyness), hardness, and sweetness from the permeating saccharides by the 11 panelists. The results were shown in Table 1. In the following experiments, "onigiri" (rice ball) is evaluated on the properties of retrogradation, hardness, and sweetness. The property of retrogradation was evaluated in four grades, i.e. "A" (suave with almost the same eating-quality characteristics as just prepared), "B" (suave with good eating-quality characteristics but reduced viscosity than just prepared), "C" (roughened but eatable), and "D" (disagreeable to the taste with marked deterioration of the textures). The property of hardness was evaluated in four grades, i.e. "A" (remaining softness as just prepared), "B" (suave with good eating-quality characteristics with a little reduced softness than just prepared), "C" (hardened but eatable), and "D" (hardened and disagreeable to the taste with marked deterioration of the texture). The property of sweetness was evaluated in three grades, i.e. "A" (not sweetened up by the permeating saccharide), "B" (a little sweet without deterioration of eating-quality characteristics), and "D"(sweet with affected eating-quality characteristics). The grade of each property was determined as the grade evaluated in by 8 or more of the 11 panelists. In the present specification, the eating-quality characteristics of the "onigiri" (rice ball) or the rice for its preparation are judged to be kept with the evaluation of "A" or "B". The hardness of the rice used for "onigiri" (rice ball) preparation was measured also with a rheometer "NRM-2010J-CW" (commercialized by Fudoh Kogyo Co., Ltd.) and the resulting data was compared with the results from the above evolution test. It was found that the evaluation at remaining the softness as just prepared corresponds to 1100 $g/cm^2$ to under 1250 $g/cm^2$, the evaluation at being suave with good eating-quality characteristics but reduced softness than prepared corresponds to 1250 $g/cm^2$ to under 1350 $g/cm^2$, the evaluation at being eatable with hardness corresponds to 1350 $g/cm^2$ to under 1450 $g/cm^2$, and the evaluation at being less suave with hardness and marked deterioration of eating-quality characteristics corresponds to 1450 $g/cm^2$ or more. Another soft rice was analyzed with the above rheometer and it was found that the evaluation at being eatable with softness corresponds to 1000 $g/cm^2$ to under 1100 $g/cm^2$ and the evaluation at being less suave with increased softness corresponds to under 1000 $g/cm^2$.

As evident from Table 1, every saccharide inhibited retrogradation and hardening as compared to no addition of the saccharides. Particularly, in the cases of the permeation of maltose, α,α-trehalose, or α-maltosyl α,α-trehalose rich syrup, the rices kept good eating-quality characteristics by inhibition of the retrogradation and hardening at 48 hours after preparation. In the cases of the permeation of sucrose or maltitol, the retrogradation of the rices was inhibited at 36 hours after preparation. But since they became so sweet by the permeating saccharide, these saccharides were not applicable to "hakuhan" (plain cooked rice) because of the altered eating-quality characteristics.

These results indicate that a permeation of maltose, α,α-trehalose, or α-maltosyl α,α-trehalose rich syrup into a cooked rice by admixing can keep the eating-quality characteristics of the rice or "onigiri" (rice ball) made of it for a longer period than in cases of using sucrose or no saccharide.

Experiment 2

Effects of the Combinations of the Saccharides on Deterioration of Eating-Quality Characteristics of Rice While Experiment 1 demonstrated that a permeation of α,α-trehalose or maltose into a rice inhibits its deterioration of eating-quality characteristics for a long period, the efficacy for the sweetness admitted of improvement. Then the effects of the combined saccharides in the ratios shown in Table 2 were investigated on the deterioration of eating-quality characteristics of the rice. Experiment 2 was performed under the same conditions as Experiment 1 except that the combination of the saccharides was altered. The same saccharides were used as in Experiment 1. The results were shown in Table 2. In the following experiments, the ratios of the saccharides were based on the weight of dry solid.

TABLE 1

| Permeating saccharides | 24 Hours after preparation | | | 36 Hours after preparation | | | 48 Hours after preparation | | |
|---|---|---|---|---|---|---|---|---|---|
| | Retrogradation | Hardness | Sweetness | Retrogradation | Hardness | Sweetness | Retrogradation | Hardness | Sweetness |
| Non | D | D | A | D | D | A | D | D | A |
| Glucose | B | B | D | C | C | D | D | D | D |
| Maltose | A | A | B | A | A | B | A | A | B |
| α,α-Trehalose | A | A | B | A | A | B | A | A | B |
| Enzymatically saccharified syrup | B | B | A | C | C | A | D | D | A |
| Maltotetraose rich syrup | A | A | A | B | C | A | D | D | A |
| Maltitol | A | A | D | A | B | D | B | C | D |
| Highly saccharified hydrogenated syrup | B | B | D | C | C | D | D | D | D |
| Lowly saccharified hydrogenated syrup | B | B | A | C | C | A | D | D | A |
| α-Maltosyl α,α-trehalose rich syrup | A | A | A | A | B | A | A | B | A |
| Sucrose | A | A | D | B | C | D | D | D | D |

TABLE 2

| Permeating saccharides | | Ratio of saccharides | | | | | | | | |
|---|---|---|---|---|---|---|---|---|---|---|
| Maltose | | 1 | 0 | 0 | 1 | 0 | 0 | 1 | 1 | 1 |
| α,α-Trehalose | | 0 | 1 | 1 | 1 | 1 | 0 | 1 | 1 | 1 |
| Maltotatraose rich syrup | | 0 | 0 | 1 | 0 | 1 | 1 | 1 | 0 | 0 |
| α-Maltosyl α,α-trehalose rich syrup | | 0 | 0 | 1 | 0 | 0 | 0 | 0 | 1 | 0 |
| Enzymatically saccharified syrup | | 0 | 0 | 1 | 0 | 0 | 1 | 0 | 0 | 1 |
| 24 Hours after preparation | Retrogradation | A | A | A | A | A | A | A | A | A |
| | Hardness | A | A | A | A | A | A | A | A | A |
| | Sweetness | B | B | B | B | B | A | A | B | A |
| 36 Hours after preparation | Retrogradation | A | A | A | A | A | C | A | A | B |
| | Hardness | A | A | A | A | B | C | A | A | B |
| | Sweetness | B | B | B | B | B | A | A | B | A |
| 48 Hours after preparation | Retrogradation | B | B | B | A | C | C | A | A | C |
| | Hardness | B | B | B | A | C | D | A | A | C |
| | Sweetness | B | B | B | B | A | A | A | B | A |

As evident from Table 2, in the case that the mixture of equal parts of maltotatraose rich syrup and enzymatically-saccharified syrup was allowed to permeate, the rices deteriorated in eating-quality characteristics with their retrogradation and hardening at 36 hours after preparation. On the other hand, in the case that the saccharides comprising α,α-trehalose and/or maltose were allowed to permeate, the deterioration of eating-quality characteristics of the rices were inhibited with inhibited retrogradation and hardening at 36 hours after preparation. Particularly, in the case that the mixture comprising equal parts by weight of α,α-trehalose and maltose, the mixture comprising equal parts by weight of maltose, α,α-trehalose, and maltotetraose rich syrup, and the mixture comprising equal parts by weight of maltose, α,α-trehalose, and saccharide-derivatives of α,α-trehalose, on a dry solid basis, were allowed to permeate into the rices, each rice was evaluated as "A" in the properties of retrogradation and hardening at 48 hours after preparation, and the good eating-quality characteristics were kept. In respect of sweetness, the combination of equal parts by weight of maltose, α,α-trehalose, and maltotetraose rich syrup was the most preferable since the rices permeated with the mixture of the above saccharides was not be sweetened thereby at all. Eight of the 11 panelists evaluated that the rice permeated with α,α-trehalose, maltose and saccharide comprising saccharide-derivatives of α,α-trehalose was less sweet than the rice permeated by α,α-trehalos and maltose, but sweeter than the rice permeated with the saccharide comprising maltotetraose rich syrup.

Experiment 3
Effects of the Concentration of the Saccharides on Deterioration of Eating-Quality Characteristics of Rice Using the mixture of equal parts of α,α-trehalose, maltose, and maltotetraose rich syrup on a dry solid basis, which proved to be beneficially effective for inhibition of the deterioration of eating-quality characteristics of the rice, the following experiment was performed to investigate the effects of the saccharide concentration on the deterioration of eating-quality characteristics of the rice. The equal parts of maltose, α,α-trehalose, and maltotetraose rich syrup, on a dry solid basis, were dissolved in water by heating to give the saccharide solutions at the total concentrations shown in Table 3. The saccharide solutions were admixed to the rice diet to investigate the effects of the solutions permeating into the rice on the keeping of eating-quality characteristics. The experiment was performed by the same way as Experiment 1 except that the concentrations of the saccharide were altered. The same saccharides were used as in Experiment 1. The results were shown in Table 3.

TABLE 3

| Permeating saccharides | | | | | Ratio of saccharides | | | | | | |
|---|---|---|---|---|---|---|---|---|---|---|---|
| Maltose | | | | | 1 | | | | | | |
| α,α-Trehalose | | | | | 1 | | | | | | |
| Maltotatraose rich syrup | | | | | 1 | | | | | | |
| Concentration of the syrup for soaking rice (%) | 30 | 35 | 40 | 45 | 50 | 55 | 60 | 65 | 70 | 75 | 80 |
| 24 Hours after preparation Retrogradation | A | A | A | A | A | A | A | A | A | A | A |
| Hardness | A | A | A | A | A | A | A | A | A | A | A |
| Sweetness | A | A | A | A | A | A | A | A | A | A | B |
| 36 Hours after preparation Retrogradation | C | C | C | A | A | A | A | A | A | A | A |
| Hardness | C | C | C | B | B | B | A | A | A | A | A |
| Sweetness | A | A | A | A | A | A | A | A | A | A | B |
| 48 Hours after preparation Retrogradation | D | C | C | B | B | A | A | A | A | A | A |
| Hardness | D | D | C | B | B | A | A | A | A | A | A |
| Sweetness | A | A | A | A | A | A | A | A | A | A | B |

As evident from Table 3, in the case that the concentration of the saccharide was 40% or less, the rice deteriorated in eating-quality characteristics with retrogradation and hardening at 36 hours after preparation and became sticky. In the case that the concentration of the saccharide solutions was 45% to 80%, the deterioration of eating-quality characteristics was inhibited with low or no retrogradation and hardening at 36 hours after preparation. Particularly, in the case that the saccharide solutions of 50% to 80% were allowed to permeate, the deterioration of eating-quality characteristics was inhibited at 48 hours after preparation. In respect of sweetness, in the case that the saccharide solution at the concentration of 80%, the sweetness of the saccharides was recognized. The test using the saccharide solution at the concentration of 85% was canceled because of its insufficient and nonhomogeneous mix with the rice and low permeability caused by the low volume of the solution.

These results indicate that the permeation of the saccharide solution at the concentration of 45% to 80%, preferably 50% to 80%, more preferably 55% to 75%, into the rice was effective for inhibiting the deterioration of eating-quality characteristics.

Experiment 4
Effects of the Amount of the Permeating Saccharides on Deterioration of Eating-Quality Characteristics of Rice The following experiment was performed to investigate the effects of the amount of the permeating saccharides comprising equal parts of α,α-trehalose, maltose, and maltotetraose rich syrup on a dry solid basis on the deterioration of eating-quality characteristics of the rice. The saccharide solution at the total concentration of 65% on a dry solid basis was prepared, which comprise equal parts of maltose, α,α-trehalose, and maltotetraose rich syrup on a dry solid basis. An adequate volume of the above saccharide solutions were admixed to the rice steamed with residual heat after boiling for 10 minutes to give the percentages of the permeating saccharide to the raw rice as in Table 4 and the effects of the amount of the permeating saccharide was investigated on the deterioration of eating-quality characteristics of the rice. The experiment was performed by the same way as Experiment 1 except that the amount of the saccharide solutions was altered. The same saccharides were used as in Experiment 1. The result was shown in Table 4.

recognized in the case that the percentage of the permeating saccharides to the raw rice was 15% or less, and a little sweetness of the permeating saccharides was recognized in the case that the percentage of the permeating saccharides to the raw rice was 20% or 25%. In the case that the percentage of the permeating saccharides to the raw rice was 30% or more, the rice deteriorated in eating-quality characteristics by the over sweetness.

These results indicate that the permeation of the saccharides at 3% to 25%, preferably 5% to 15% of the raw rice on a dry solid basis is effective for inhibition of the deterioration of eating-quality characteristics of rices or "onigiri" (rice ball).

Experiment 5
Effects of the Ratio of α,α-Trehalose to Maltose on Deterioration of Eating-Quality Characteristics of Rice

TABLE 4

| Permeating saccharides | Ratio of saccharides | | | | | | | | | |
|---|---|---|---|---|---|---|---|---|---|---|
| Maltose | 1 | | | | | | | | | |
| α,α-Trehalose | 1 | | | | | | | | | |
| Maltotatraose rich syrup | 1 | | | | | | | | | |

| Percentage of the saccharide to the raw rice (%) | | 0 | 1 | 2 | 3 | 5 | 10 | 15 | 20 | 25 | 30 |
|---|---|---|---|---|---|---|---|---|---|---|---|
| 24 Hours after preparation | Retrogradation | B | A | A | A | A | A | A | A | A | A |
| | Hardness | B | A | A | A | A | A | A | A | A | A |
| | Sweetness | A | A | A | A | A | A | A | B | B | D |
| 36 Hours after preparation | Retrogradation | D | C | B | A | A | A | A | A | A | A |
| | Hardness | D | C | B | B | A | A | A | A | A | A |
| | Sweetness | A | A | A | A | A | A | A | B | B | D |
| 48 Hours after preparation | Retrogradation | D | D | B | B | A | A | A | A | A | A |
| | Hardness | D | D | C | B | A | A | A | A | A | A |
| | Sweetness | A | A | A | A | A | A | A | B | B | D |

As evident from Table 4, the rice hardened and retrograded at hours after preparation in the case that the percentage of the permeating saccharide to the raw rice was 1% or less, and the rice hardened at 48 hours after preparation in the case of 2% or less. In each case, the rices deteriorated in the eating-quality characteristics. On the other hand, in the case that the percentage of the permeating saccharide to the raw rice was 3% or more, good eating-quality characteristics were kept with low or no retrogradation and hardening at 48 hours after preparation. Particularly, in the case that the percentage of the permeating saccharide to the raw rice was 5% or more, the deterioration of eating-quality characteristics was inhibited and eating-quality characteristics as just prepared were almost kept at 48 hours after preparation. In respect of sweetness, the sweetness of the permeating saccharides was not The following experiment was performed to investigate the effects of the ratio of α,α-trehalose to maltose on the deterioration of eating-quality characteristics of the rice by using α,α-trehalose, maltose, and maltotetraose rich syrup. The saccharide solution at the total concentration of 65% on a dry solid basis was prepared, which comprise α,α-trehalose, maltose, and maltotetraose rich syrup in the ratios in Table 5 on a dry solid basis. Each of the saccharide solution was allowed to permeate into the rice and the effects were investigated on the deterioration of eating-quality characteristics of the rice. The experiment was performed by the same way as in Experiment 1 except that the ratio of the saccharides was altered. The same saccharides were used as in Experiment 1. The result was shown in Table 5.

TABLE 5

| Permeating saccharides | | Ratio of saccharides | | | | | | | | | | |
|---|---|---|---|---|---|---|---|---|---|---|---|---|
| Maltose | | 2.0 | 1.8 | 1.6 | 1.4 | 1.2 | 1.0 | 0.8 | 0.6 | 0.4 | 0.2 | 0.0 |
| α,α-Trehalose | | 0.0 | 0.2 | 0.4 | 0.6 | 0.8 | 1.0 | 1.2 | 1.4 | 1.6 | 1.8 | 2.0 |
| Maltotatraose rich syrup | | | | | | | 1.0 | | | | | |
| 24 Hours after preparation | Retrogradation | A | A | A | A | A | A | A | A | A | A | A |
| | Hardness | A | A | A | A | A | A | A | A | A | A | A |
| | Sweetness | A | A | A | A | A | A | A | A | A | A | A |
| 36 Hours after preparation | Retrogradation | A | A | A | A | A | A | A | A | A | A | A |
| | Hardness | A | A | A | A | A | A | A | A | A | A | A |
| | Sweetness | A | A | A | A | A | A | A | A | A | A | A |
| 48 Hours after preparation | Retrogradation | B | B | A | A | A | A | A | A | A | A | B |
| | Hardness | B | B | B | A | A | A | A | A | A | B | B |
| | Sweetness | A | A | A | A | A | A | A | A | A | A | A |

As evident from Table 5, in the case of any ratio of maltose to α,α-trehalose, eating-quality characteristics of the rice were kept as just prepared by inhibition of the retrogradation or hardening of the starch at 48 hours after preparation. Particularly, in the case that the ratio of maltose to α,α-trehalose were 9:1 to 4:1, the effect of antiretrogradation of the starch was higher than in the case that each saccharide was used alone. In the case that the ratio is 4:1 to 3:7, the inhibitive effects of antiretrogardation of the starch and hardening of the starch were large.

These results indicate that the ratio of α,α-trehalose to maltose is preferable to be 9:1 to 1:4, preferably 4:1 to 3:7 to inhibit the deterioration of eating-quality characteristics of rice or "onigiri" (rice ball).

Experiment 6
Effects of the Ratio of Other Saccharides on Deterioration of Eating-Quality Characteristics of Rice The following experiment was performed to investigate the effects of the ratio of α,α-trehalose and/or maltose to other saccharides on the deterioration of eating-quality characteristics by using α,α-trehalose, maltose, maltotetraose rich syrup, and saccharide-derivatives of α,α-trehalose. The saccharide solutions at the total concentration of 65% on a dry solid basis were prepared, which comprise α,α-trehalose, maltose, maltotetraose rich syrup, and saccharide-derivatives of α,α-trehalose in the ratios on a dry solid basis shown in Table 6. Each of the saccharide solutions was allowed to permeate into the rice and the effects were investigated on the deterioration of eating-quality characteristics of the rice. The experiment was performed by the same way as Experiment 1 except that the ratio of the saccharides was altered. The same saccharides were used as in Experiment 1. The results were shown in Table 6.

for 20% on a dry solid basis. In the case that α,α-trehalose and maltose accounted for 29% or more of the permeating saccharide, good eating-quality characteristics of the rice was kept with low or no retrogradation and hardening of the starch at 48 hours after preparation. Particularly, in the case that α,α-trehalose and maltose accounted for 34% or more of the permeating saccharide, the rice were evaluated as "A" in the properties of retrogradation and hardening, and the eating-quality characteristics were kept as just prepared at 48 hours after preparation. In respect of sweetness, a little sweetness of the permeating saccharides was recognized in the case that α,α-trehalose and maltose accounted for 70% or more of the permeating saccharides.

These results indicate that the ratio of α,α-trehalose and maltose to the total saccharide on a dry solid basis was preferable to be 29% or more, preferably 34% to 69% to inhibit the deterioration of eating-quality characteristics of rices or "onigiri" (rice ball) when maltotetraose rich syrup or saccharide-derivatives of α,α-trehalose were used along with α,α-trehalose and maltose.

Experiment 7
Effects of the Holding Time of Rice at a Prescribed Temperature after the Addition of the Saccharides on Deterioration of Eating-Quality Characteristics of Rice The following experiment was performed to investigate the effects of the holding time of rice at the prescribed temperature after the addition of α,α-trehalose, maltose, maltotetraose rich syrup. The saccharide solution at the total concentration of 65% on a dry solid basis was prepared, which comprises equal parts by weight of maltose, α,α-trehalose, and maltotetraose rich syrup on a dry solid basis. The rices immediately after boiling were admixed with the saccharide

TABLE 6

| Permeating saccharides | Ratio of saccharides | | | | | | | | | | | | | | |
|---|---|---|---|---|---|---|---|---|---|---|---|---|---|---|---|
| Maltose | | | | | | | 1.0 | | | | | | | | |
| α,α-Trehalose | | | | | | | 1.0 | | | | | | | | |
| Maltotatraose rich syrup | 0.0 | 0.5 | 0.9 | 1.1 | 3.0 | 3.8 | 5.0 | 8.0 | | | | 0.0 | | | |
| α-Maltosyl α,α-trehalose rich syrup | | | | 0.0 | | | | | 0.5 | 0.9 | 1.1 | 3.0 | 3.8 | 5.0 | 8.0 |
| Percentage of the amount of maltose and α,α-trehalose to total saccharide (%) | 100 | 80 | 69 | 65 | 40 | 34 | 29 | 20 | 80 | 69 | 65 | 40 | 34 | 29 | 20 |
| 24 Hours after preparation — Retrogradation | A | A | A | A | A | A | A | A | A | A | A | A | A | A | A |
| 24 Hours after preparation — Hardness | A | A | A | A | A | A | A | A | A | A | A | A | A | A | A |
| 24 Hours after preparation — Sweetness | B | B | A | A | A | A | A | B | A | A | A | A | A | A | A |
| 36 Hours after preparation — Retrogradation | A | A | A | A | A | A | A | C | A | A | A | A | A | A | C |
| 36 Hours after preparation — Hardness | A | A | A | A | A | A | A | C | A | A | A | A | A | A | C |
| 36 Hours after preparation — Sweetness | B | B | A | A | A | A | A | B | A | A | A | A | A | A | A |
| 48 Hours after preparation — Retrogradation | A | A | A | A | A | A | B | D | A | A | A | A | A | B | D |
| 48 Hours after preparation — Hardness | A | A | A | A | A | A | B | D | A | A | A | A | A | B | D |
| 48 Hours after preparation — Sweetness | B | B | A | A | A | A | A | B | A | A | A | A | A | A | A |

As evident from Table 6, in either case of using maltotetraose rich syrup or saccharide-derivatives of α,α-trehalose, the retrogradation or hardening of the starch was observed at 36 hours after preparation when the rice was permeated with the saccharide of which α,α-trehalose and maltose accounted solution in the way as Experiment 1 and held during the time shown in Table 7 to be permeated with the saccharides. After cooling, the effects of the steaming time with residual heat were investigated on the deterioration of eating-quality characteristics. The same saccharides were used as in Experiment 1. These results were shown in Table 7. The rices were shaped to "onigiri" (rice ball) after cooling at 30° C. or less.

TABLE 7

| Permeating saccharides | | Ratio of saccharides | | | | | | | | |
|---|---|---|---|---|---|---|---|---|---|---|
| Maltose | | 1 | | | | | | | | |
| α,α-Trehalose | | 1 | | | | | | | | |
| Maltotatraose rich syrup | | 1 | | | | | | | | |
| Concentration of the saccharide solution (%) | | 65 | | | | | | | | |
| Steaming time with residual heat after addition of saccharide solution (min) | | 2 | 5 | 15 | 25 | 35 | 45 | 50 | 60 | 80 | 90 |
| 24 Hours after preparation | Retrogradation | A | A | A | A | A | A | A | A | A | A |
| | Hardness | A | A | A | A | A | A | A | A | A | A |
| | Sweetness | A | A | A | A | A | A | A | A | A | A |
| 36 Hours after preparation | Retrogradation | C | B | A | A | A | A | A | A | A | A |
| | Hardness | C | B | A | A | A | A | A | A | A | A |
| | Sweetness | A | A | A | A | A | A | A | A | A | A |
| 48 Hours after preparation | Retrogradation | C | C | B | A | A | A | A | A | A | A |
| | Hardness | D | C | B | A | A | A | A | A | A | A |
| | Sweetness | A | A | A | A | A | A | A | A | A | A |

As evident from Table 7, in the case that the rice was held for 2 minutes, the rice deteriorates in eating-quality characteristics with perceptible rertogradaion and hardening at 36 hours after preparation. On the other hand, in the case that the rice was heard for 5 minutes or more, good eating-quality characteristics were kept with low or no retrogradation or hardening of the starch at 36 hours after preparation. In the case that the rice was held for 15 minutes or more, good eating-quality characteristics were kept with low or no retrogradation or hardening of the starch at 48 hours after preparation. Particularly, in the case that the rice was held for 25 minutes or more, the rice were evaluated as "A" in the propertys of retrogradation and hardening and the eating-quality characteristics were kept as just prepared at 48 hours after preparation.

These results indicate that the holding time of the rice at a prescribed temperature for the saccharide permeation is preferable to be 5 minutes or more, preferably 15 minutes or more, more preferably 25 minutes or more for inhibition of the deterioration of eating-quality characteristics of the rice and "onigiri" (rice ball). In respect of the working efficiency, since the holding time of the rice is usually 180 minutes or less, preferably 90 minutes or less, more preferably 60 minutes or less, the holding time of the rice for permeation of the saccharides was preferable 5 to 180 minutes, preferably 5 to 90 minutes, more preferably 15 to 60 minutes, much more preferably 25 to 60 minutes.

Experiment 8
Effects of the Temperature for Holding Rice for a Prescribed Period to Permeation of the Saccharide after the Addition of the Saccharides on Deterioration of Eating-Quality Characteristics of Rice The following experiment was performed to investigate the effects of the temperature for holding the rice for a prescribed period for permeation of the saccharide after the addition of α,α-trehalose, maltose, and maltotetraose rich syrup on the deterioration of eating-quality characteristics of the rice. The saccharide solution at the total concentration of 65% on a dry solid basis was prepared, which comprise equal parts by weight of α,α-trehalose, maltose, and maltotetraose rich syrup on a dry solid basis. The saccharide solution warmed at a prescribed temperature was admixed to the rices and the temperature of each rice was adjusted as at the temperatures shown in Table 8. The rices were kept at the temperatures for permeation of the saccharides and the effects of the temperature were investigated. The experiment was performed by the same way as Experiment 1 except that the temperature for holding rice for the saccharide permeation was altered and the holding time was 50 minutes. The same saccharides were used as in Experiment 1. The results were shown in Table 8.

TABLE 8

| Permeating saccharides | | Ratio of saccharides | | | | | | | |
|---|---|---|---|---|---|---|---|---|---|
| Maltose | | 1 | | | | | | | |
| α,α-Trehalose | | 1 | | | | | | | |
| Maltotatraose rich syrup | | 1 | | | | | | | |
| Temperature for steaming with residual heat after addition of saccharide solution (° C.) | | 40 | 50 | 60 | 70 | 80 | 90 | 100 | 104 |
| 24 Hours after preparation | Retrogradation | A | A | A | A | A | A | A | A |
| | Hardness | A | A | A | A | A | A | A | B |
| | Sweetness | A | A | A | A | A | A | A | A |
| 36 Hours after preparation | Retrogradation | C | A | A | A | A | A | A | A |
| | Hardness | B | A | A | A | A | A | A | B |
| | Sweetness | A | A | A | A | A | A | A | A |
| 48 Hours after preparation | Retrogradation | D | B | B | A | A | A | A | A |
| | Hardness | C | B | B | A | A | A | B | C |
| | Sweetness | A | A | A | A | A | A | A | A |

As evident from Table 8, in the case that the temperature for steaming with residual heat was 40° C., the retrogradation of the starch was observed at 36 hours after preparation. In the case that the temperature for steaming with residual heat was 50° C. or more, good eating-quality characteristics were kept with low or no retrogradation and hardening of the starch at 36 hours after preparation. Particularly, low or no deterioration of the eating-quality characteristics were observed at 48 hours after preparation in the case that the temperature for steaming with residual heat was 70 to 100° C., and the deterioration of eating-quality characteristics were inhibited at 48 hours after preparation in the case that the temperature for steaming with residual heat was 70 to 90° C. Nine of the 11 panelist evaluated that the rice became uneven in hardness because of presumable uneven permeation of the saccharides in the case that the temperature for steaming with residual heat was 100° C. or more, and that the rice deteriorated in eating-quality characteristics with the large unevenness at 48 hours after preparation in the case that the temperature for steaming with residual heat was 104° C. or more.

These results indicate that the temperature for steaming with residual heat is preferable to be 50 to 100° C., preferably 60 to 100° C., more preferably 70 to 90° C. for the inhibition of the deterioration of eating-quality characteristics of rice or "onigiri" (rice ball).

Experiment 9
Effects of the Saccharide Permeation into Rice after Boiled on the Deterioration of Eating Quality-Characteristics of the Rice Preliminarily Boiled with Saccharides The following experiment was performed to investigate the effects of the saccharide permeation into rice after boiled on the deterioration of eating-quality characteristics of the rice preliminarily boiled with the saccharides. The experiment was performed by the same way as the case of the saccharide permeation of 10% of the raw rice in Experiment except that the rice was boiled with α,α-trehalose at the ratio to the raw rice on a dry solid basis shown in Table 9. The same saccharides were used as in Experiment 1. The effects on the deterioration of eating-quality characteristics of "onigiri" (rice ball) were sensorily evaluated at 60 and 72 hours in addition to 24, 36, and 48 hours after preparation. The results were shown in Table 9.

TABLE 9

| Percentage of α,α-trehalose to raw rice (%) | | 0 | 0.5 | 1 | 2 | 3 | 4 | 5 | 6 |
|---|---|---|---|---|---|---|---|---|---|
| 24 Hours after preparation | Retrogradation | A | A | A | A | A | A | A | A |
| | Hardness | A | A | A | A | A | A | A | D |
| | Sweetness | A | A | A | A | A | A | B | B |
| 36 Hours after preparation | Retrogradation | A | A | A | A | A | A | A | A |
| | Hardness | A | A | A | A | A | A | A | D |
| | Sweetness | A | A | A | A | A | A | B | B |
| 48 Hours after preparation | Retrogradation | A | A | A | A | A | A | A | A |
| | Hardness | A | A | A | A | A | A | A | D |
| | Sweetness | A | A | A | A | A | A | B | B |
| 60 Hours after preparation | Retrogradation | D | D | B | A | A | A | B | D |
| | Hardness | D | D | B | A | A | A | B | D |
| | Sweetness | A | A | A | A | A | A | B | B |
| 72 Hours after preparation | Retrogradation | D | D | C | B | A | A | B | D |
| | Hardness | D | D | C | B | A | A | B | D |
| | Sweetness | A | A | A | A | A | A | B | B |

As evident from Table 9, in the case of the rice boiled with α,α-trehalose of no or 0.5% of the raw rice on a dry solid basis, the retrogradation and hardening of the rices were observed at 60 hours after preparation. On the other hand, in the case of the rice boiled with α,α-trehalose of 1 to 5% of the raw rice on a dry solid basis, good eating-quality characteristics of the rices were kept with low or no retrogradation and hardening at 60 hours after preparation. Particularly, in the case of the rice boiled with α,α-trehalose of 2 to 4% of the raw rice on a dry solid basis, the eating-quality characteristics as just prepared were almost kept because of the inhibition of the deterioration of the eating-quality characteristics at 72 hours after preparation. The above effect was large in the case of the rice boiled with α,α-trehalose of 3 to 4% of the raw rice on a dry solid basis. In the case of the rice boiled with α,α-trehalose of 6% of the raw rice on a dry solid basis, the rice became uneven in hardness and the retrogradation of the starch was observed at 60 hours after preparation.

These results indicate that the inhibitive effect of permeating saccharides into the rice after boiling on the deterioration of eating-quality characteristics can be increased by the boiling of the rice with α,α-trehalose of which percentage to the raw rice is preferable to be 1 to 5%, preferably 2 to 4%, more preferably 3 to 4%. In the case of the rice boiled with α,α-trehalose of 5% or more of the raw rice on a dry solid basis, the deterioration of the eating-quality characteristics of the rice was observed by uneven gelatinization or retrogradation of the starch.

Experiment 10
Effects of the Permeation of the Saccharides on the Deterioration of Eating-Quality Characteristics of "Sushi-Meshi" (Vinegared Rice)

Since the efficacy of the saccharide permeation into rice after boiling on inhibition of the deterioration of eating-quality characteristics was demonstrated in Experiments 1 to 9, the following experiment was performed to investigate whether it is effective on "sushi-meshi" (vinegared rice). The seasoned vinegars for test were prepared with seasoning in the composition ratios shown in Table 10 and warmed at 80° C. And the rice was boiled with "TREHA®" (hydrous crystalline α,α-trehalose commercialized by Hayashibara Shoji, Inc.) of 3% of the raw rice on a dry solid basis as in Experiment 9. The rice was put into a vessel with the lid and admixed with the seasoned vinegar prepared above at the percentage shown in Table 10. Then "sushi-meshi" (vinegared rice) was made after holding it at 80° C. until the seasoned vinegar and the saccharides permeate into the rice. As a reference, another "sushi-meshi" (vinegared rice) was prepared as the same way except that a commercially produced seasoned vinegar containing sucrose was used. The "sushi-meshi" (vinegared rice) was segmented in small portions and stored at 4° C. Fifteen panelists sensorily evaluated them everyday from the day of preparation to day 7. The results were shown in Table 10. To compare the ratio of the amounts of the starch (85% of the raw rice) contained in "sushi-meshi" (vinegared rice) to the other ingredients, the weight of the starch was divided by the weight of the "sushi-meshi" (vinegared rice) then multiplied by 100 to give the concentration of the starch (%) shown in Table 10. The amount of the saccharides added at boiling and the saccharides allowed permeating into the rice after boiling on a dry solid basis was shown in Table 10. In the case that the seasoned vinegar for reference (containing sucrose) is permeated at 40% or more of the boiled rice, the rice become too sweet, and in the case that the seasoned vinegar for test or reference was admixed at 80% or more of the rice, all the seasoned vinegar was not completely absorbed into the rice. In these cases, the sensory evaluation was not performed because of the unusability for "sushi" (vinegared rice diet). The "sushi-meshi" (vinegared rice) was evaluated comprehensively in degrees of retrogradation (mealyness), hardening, and sweetness of the permeating saccharides. The results were indicated in four grades, i.e. "A" (having pleasant eating-quality characteristics as just prepared), "B" (having good eating-quality characteristics but less than as just prepared), "C" (deteriorated in eating-quality characteristics but eatable), and "D" (remarkably deteriorated in eating-quality characteristics).

TABLE 10

| Cooked Rice | Raw rice | | 600 | | |
|---|---|---|---|---|---|
| | Water | | 780 | | |
| | Amount of α,α-trehalose added at boiling | 0 | | 18 | |
| Amount of rice after boiled | | 1315 | | 1325 | |
| Seasoned vinegar | | Reference | | Test | |
| Composition of seasoned | Cereal vinegar | 61 | 71 | 57 | 62 | 72 | 83 |

TABLE 10-continued

| vinegar and ratio of its ingredients | Sucrose | 110.4 | 221 | 0 | 0 | 0 | 0 |
|---|---|---|---|---|---|---|---|
| | α,α-Trehalose | 0 | 0 | 42 | 84 | 168 | 252 |
| | Maltose | 0 | 0 | 42 | 84 | 168 | 252 |
| | Salt | 18 | 21 | 17 | 19 | 22 | 25 |
| | Water | 86 | 238 | 0 | 31 | 130 | 228 |
| Percentage of seasoned vinegar to rice (%) | | 20 | 40 | 10 | 20 | 40 | 60 |
| Percentage of permeating saccharide to raw starch(%) | | 18 | 37 | 16 | 30 | 56 | 83 |
| Starch concentration of "sushi-meshi" after addition of seasoned vinegar (%) | | 30.8 | 26.4 | 33.2 | 30.4 | 26.1 | 22.8 |
| Storage period (days) | 0 | A | D | A | A | A | A |
| | 1 | D | — | B | B | B | B |
| | 2 | D | — | B | B | B | B |
| | 3 | D | — | C | B | B | B |
| | 4 | D | — | D | B | B | B |
| | 5 | D | — | D | D | B | B |
| | 6 | D | — | D | D | D | B |
| | 7 | D | — | D | D | D | C |

As evident from Table 10, in the case that the seasoned vinegar for reference (containing sucrose) was added at 20% of the boiled rice, the rice deteriorated in eating-quality characteristics in one-day storage. On the other hand, in the case that the seasoned vinegar for test (containing maltose and α,α-trehalose) was added at 10, 20, 40, or 60% of the boiled rice, the inhibitive period of the deterioration of eating-quality characteristics were prolonged according to the additive amount of vinegar and good eating-quality characteristics were kept at 2, 3, 4, and 6-day storage. Generally the granularity of the rice with 30% or less of the starch concentration may decrease in the case of seasoned vinegar containing sucrose, but good eating-quality characteristics was kept with granularity in the case that the seasoned vinegar for test was added at 40 or 60% of the boiled rice.

These results indicate that the deterioration of eating-quality characteristics of the rice is inhibited after relatively long-time cold storage when "sushi-meshi" (vinegared rice) was admixed with the saccharide and held at a constant temperature for a prescribed period to be permeated with the saccharide as well as "hakuhan" (plain cooked rice). Considered with the results in Experiment 9, they indicate that the inhibitive effects on the deterioration of eating-quality characteristics of rice are increased by addition of α,α-trehalose while the rice was boiled. They also indicate that when prepared by using of seasoned vinegar containing α,α-trehalose and maltose, "sushi-meshi" (vinegared rice) can be given granularity even containing 30% or less of the starch concentration, which was believed impossible so far. The percentage of the amount of α,α-trehalose and maltose to the raw rice is preferable to be 16 to 83%, preferably 56 to 83% for exertion of the effect.

The present invention is explained by the following examples. The technical scope of the present invention is not limited by these examples.

Example 1

Frozen Rice

"TREHA®" (hydrous crystalline α,α-trehalose commercialized by Hayashibara Shoji, Inc.) was completely dissolved in water on warming to give the saccharide solution of at the concentration of 65%. Six hundreds parts by weight of a raw rice was washed and soaked in water at 15° C. for 60 minutes, then it was cooked in a conventional method and steamed by residual heat for 10 minutes. The saccharide solution warmed at 80° C. was admixed to the steamed rice to make the percentage by weight of the saccharide to the raw rice to be 8% on a dry solid basis, and then the rice was kept in keep-warm vessel for 60 minutes. After cooled, the rice was packaged into a one-feed size and stored at freezing condition for 24 hours. The eating-quality characteristics of the rice compared favorably as just prepared according to the evaluation by tasting after unfrozen at 5° C. for 24 hours.

Example 2

Frozen Rice

"SUNMALT®" (hydrous crystalline maltose commercialized by Hayashibara Shoji, Inc.) was completely dissolved in water on warming to give the saccharide solution at the concentration of 60%. Six hundreds parts by weight of raw rice was washed and soaked in water at 15° C. for 60 minutes, and then it was boiled in a conventional method and steamed by residual heat for 5 minutes. The saccharide solution warmed at 80° C. was admixed to the steamed rice to make the percentage by weight of the saccharide to the raw rice to be 18% on a dry solid basis, and then the rice was kept in keep-warm vessel for 45 minutes with occasional stirring. After cooled, the rice was packaged into a one-feed size and stored under freezing condition for 24 hours. The eating-quality characteristics of the rice compared favorably as just prepared according to the evaluation by tasting after unfrozen at 5° C. for 24 hours.

Example 3

Rice for Chilling

Thirty-three parts by weight of "TREHA®" (hydrous crystalline α,α-trehalose commercialized by Hayashibara Shoji, Inc.) and 32 parts by weight of "SUNMALT®" (hydrous crystalline maltose commercialized by Hayashibara Shoji, Inc.) were completely dissolved in 35 parts by weight of water on warming to give the saccharide solution at the concentration of 70%. Six hundreds parts by weight of raw rice was washed and soaked in water at 15° C. for 60 minutes, and then it was boiled in a conventional method and steamed by residual heat for 20 minutes. The saccharide solution warmed at 80° C. was admixed to the steamed rice to make the percentage by weight of the saccharide to the raw rice to be 12% on a dry solid basis, and then the rice was kept in keep-warm vessel for 50 minutes with occasional mixing. After cooled, the rice was packaged into a one-feed size and stored under chilling condition for 24 hours. The eating-quality characteristics of the rice compared favorably as just prepared according to the evaluation by tasting.

Example 4

Rice for Chilling

A cooked rice was prepared by the same way as Example 3 except that the rice was boiled with "TREHA®" (hydrous crystalline α,α-trehalose commercialized by Hayashibara Shoji, Inc.) which was added at 3% of the raw rice on a dry solid basis. After cooled, the rice was packaged into a one-feed size and stored under chilling condition for 48 hours. The eating-quality characteristics of the rice were kept as just prepared on the evaluation by tasting.

The cooked rice prepared by the method of Example 3 or Example 4 was packaged into a one-feed size and stored under chilling condition for 4 days. The eating-quality characteristics of the rice prepared by the method of Experiment 4 rather than Experiment 3 were kept as just prepared according to the evaluation by tasting.

Example 5

"Onigiri" (Rice Ball)

Twenty four parts by weight of "TREHA®" (hydrous crystalline α,α-trehalose commercialized by Hayashibara Shoji, Inc.), 23 parts by weight of "SUNMALT®" (hydrous crystalline maltose commercialized by Hayashibara Shoji, Inc.), and 40 parts by weight of "TETRUP-H®" (maltotetraose rich syrup commercialized by Hayashibara Shoji, Inc.) were completely dissolved in 23 parts by weight of water on warming to give the saccharide solution at the concentration of 65%. Six hundreds parts by weight of raw rice was washed and soaked in water at 10° C. for 60 minutes, and then it was boiled in a conventional method and steamed by residual heat for 30 minutes. One hundred parts by weight of the saccharide solution warmed at 80° C. was admixed to the steamed rice, and then the rice was kept under the temperature in keep-warm vessel for 30 minutes with occasional stirring. Then the rice was shaped into "onigiri" (rice ball) and stored at 5° C. for 24, 36, and 48 hours. The eating-quality characteristics of each rice compared favorably as just prepared according to the evaluation by tasting.

Example 6

"Sushi-Meshi" (Vinegared Rice)

Twelve parts by weight of "TREHA®" (hydrous crystalline α,α-trehalose commercialized by Hayashibara Shoji, Inc.), 1 part by weight of "SUNMALT®" (hydrous crystalline maltose commercialized by Hayashibara Shoji, Inc.), 1 part by weight of "TETRUP-H®" (maltotetraose rich syrup commercialized by Hayashibara Shoji, Inc.), 24 parts by weight of sucrose, and 6 parts by weight of salt were completely dissolved in 25 parts by weight of tap water on warming, then added with 30 parts by weight of cereal vinegar after cooled to give the saccharide solution containing vinegar. Six hundreds parts by weight of raw rice was washed and soaked in water at 15° C. for 60 minutes, and then it was boiled in a conventional method after addition of 1.35 parts by weight of water to one part by weight of the raw rice and steamed by residual heat for 15 minutes. Two hundred parts by weight of the saccharide solution warmed at 30° C. was admixed to the steamed rice, and then the rice was left for 5 minutes (final temperature of the rice was 55° C.). Then the rice was cooled by spreading in a vat to give "sushi-meshi" (vinegared rice). It was shaped into "shari" (vinegared rice ball) and stored at −20° C. for one week. The eating-quality characteristics of the "shari" (vinegared rice ball) compared favorably as just prepared according to the evaluation by tasting after unfrozen at 5° C. for 24 hours. It is usable as "shari" (vinegared rice ball) for hand-shaped "sushi" (vinegared rice diet) as it is or under refrigeration, or after unfrozen following freezing. When hand-shaped "sushi" (vinegared rice diet) made by topping of "neta" ("sushi" (vinegared rice diet) item) on this "shari" (vinegared rice ball) is stored under freezing condition, the eating-quality characteristics of "shari" (vinegared rice ball) and "neta" ("sushi" (vinegared rice diet) item) can be kept as just prepared for a relatively long period.

Example 7

"Gomoku-Gohan" (Seasoned Rice Cooked with Ingredients)

Twenty four parts by weight of "TREHA®" (hydrous crystalline α,α-trehalose commercialized by Hayashibara Shoji, Inc.), 23 part by weight of "SUNMALT®" (hydrous crystalline maltose commercialized by Hayashibara Shoji, Inc.), and 40 part by weight of "TETRUP-H®" (maltotetraose rich syrup commercialized by Hayashibara Shoji, Inc.) were completely dissolved in 23 parts by weight of tap water on warming to give the saccharide solution. Six hundreds parts by weight of raw rice was washed and soaked in water at 15° C. for 60 minutes. After added with commercially produced seasoning for "gomoku-gohan" (seasoned rice cooked with ingredients) and ingredients cut in suitable size, it was boiled in a conventional method and steamed by residual heat for 30 minutes. Eighty parts by weight of the saccharide solution warmed at 80° C. was admixed to the steamed "gomoku-gohan" (seasoned rice cooked with ingredients), and the "gomoku-gohan" (seasoned rice cooked with ingredients) was steamed at its temperature in keep-warm vessel for additional 30 minutes with occasional stirring. Then the "gomoku-gohan" (seasoned rice cooked with ingredients) was packaged into a one-feed size and stored under chilling condition or refrigeration for 48 hours. In each case, the eating-quality characteristics of "gomoku-gohan" (seasoned rice cooked with ingredients) compared favorably as just prepared according to the evaluation by tasting.

Example 8

"Ohagi" (Bean Cake)

Five hundred and eighty one parts by weight of "SUNMALT®" (hydrous crystalline maltose commercialized by Hayashibara Shoji, Inc.), 413 part by weight of "TREHA®" (an α,α-trehalose product commercialized by Hayashibara Shoji, Inc.), and 383 parts by weight of "HALODEX®" (syrup comprising saccharide-derivatives of α,α-trehalose commercialized by Hayashibara Shoji, Inc.) were dissolved in 123 parts by weight of water on warming to give the saccharide solution at the concentration of 80%. A mixture of equal parts of commercially available ordinary rice and glutinous rice was washed and drained off. Then 80 parts by weight of the rice was added with 112 parts by weight of water and allowed to absorb the water for 40 minutes. Then the rice was cooked with commercialized rice cooker (IH rice cooker). After cooked, the rice was moved into the storage vessel and 487 parts by weight of the rice (200 parts by weight of the raw rice) was added with 205 parts by weight of the above saccharide solution at 80° C. and held with occasionally stirring. After 30 minutes from the addition of the saccharides, 205 parts by weight of the additional saccharide solution was added to the rice and the rice was held for 30 minutes with occasional stirring to be permeated with the saccharides. "Ohagi" (bean cake) was made of this rice in a conventional way. After 48-hour storage under chilling or freezing condition, the eating-quality characteristics of each "ohagi" (bean cake) compared favorably as just prepared according to the evaluation by tasting.

Example 9

"Sekihan" (Red-Bean Rice)

Twenty four parts by weight of "TREHA®" (hydrous crystalline α,α-trehalose commercialized by Hayashibara Shoji, Inc.), 23 parts by weight of "SUNMALT®" (hydrous crystalline maltose commercialized by Hayashibara Shoji, Inc.), and 40 parts by weight of "TETRUP-H®" (maltotetraose rich syrup commercialized by Hayashibara Shoji, Inc.) were completely dissolved in 23 parts by weight of water on warming to give the saccharide solution at the concentration of 65%. Fifty parts by weight of red bean were boiled with 300 parts by weight of water on medium heat for 20 minutes. Five hundreds parts by weight of glutinous rice was soaked in the mixture solution containing 500 parts by weight of 2% α,α-trehalose solution and 100 parts by weight of the red bean broth for 15 hours and drained off in a colander. It was steamed for 45 minutes with four or five additions of the above soaking solution at every 10 minutes. After steamed, this "sekihan" (red-bean rice) was moved into keep-warm vessel and added with above saccharide solution at 80° C. to make the percentage of the saccharide to be 8% of the raw rice on a dry solid basis, and held for 60 minutes with occasional stirring. After 48-hour storage under chilling or freezing condition, the eating-quality characteristics of each "sekihan" (red-bean rice) compared favorably as just prepared according to the evaluation by tasting.

Example 10

Spaghetti

Four parts by weight of "TREHA®" (hydrous crystalline α,α-trehalose commercialized by Hayashibara Shoji, Inc.), 3 parts by weight of "SUNMALT®" (hydrous crystalline maltose commercialized by Hayashibara Shoji, Inc.), and 2 parts by weight of "TETRUP-H®" (maltotetraose rich syrup commercialized by Hayashibara Shoji, Inc.) on a dry solid basis were completely dissolved in an adequate amount of water on warming to give the saccharide solution at the concentration of 70%. One hundred parts by weight of commercially available spaghetti (dry form) was boiled in a conventional way. Immediately after boiled, the spaghetti was moved into keep-warm vessel and added with 20 parts by weight of above saccharide solution at 75° C. with gently stirring for 30 minutes to be permeated with the saccharides. After 48-hour storage at chilling or freezing condition, each spaghetti was easy to be disentangled and the eating-quality characteristics of the spaghetti compared favorably as just prepared according to the evaluation by tasting.

Example 11

Spaghetti

The spaghetti was prepared by the same way as Example 10 except that the spaghetti was boiled in water added with "TREHA®" (hydrous crystalline α,α-trehalose commercialized by Hayashibara Shoji, Inc.) at the concentration of 3.5% on a dry solid basis. After 48-hour storage at chilling or freezing condition, each spaghetti was easy to be disentangled and the eating-quality characteristics of the spaghetti compared favorably as just prepared according to the evaluation by tasting.

The spaghetti prepared by the saccharide permeation after removing the boiling water as Example 10 or 11 were stored under chilling condition for 56 hours. The eating-quality characteristics of the spaghetti prepared by the method of Experiment 11 rather than Experiment 10 were kept as just prepared according to the evaluation by tasting.

Example 12

Antideteriorating Agent in Eating-Quality Characteristics of Food Containing Gelatinized Starch "TREHA®" (hydrous crystalline α,α-trehalose commercialized by Hayashibara Shoji, Inc.), "SUNMALT®" (hydrous crystalline maltose commercialized by Hayashibara Shoji, Inc.), and "TETRUP-H®" (maltotetraose rich syrup commercialized by Hayashibara Shoji, Inc.) was dissolved in an adequate amount of water to give an antideterioratig agent in eating-quality characteristics of food containing gelatinized starch, which was the syrup at the concentration of 65% of the saccharides comprising one part of α,α-trehalose, 3 parts of maltose and one part of maltotetraose rich saccharides The agent was also spray-dried to form a powdery antideterioratig agent in eating-quality characteristics of food containing gelatinized starch.

This antideterioratig agent in eating-quality characteristics of food containing gelatinized starch can be used as it is, after dissolved in water, or with other antideterioratig agent in eating-quality characteristics of food containing gelatinized starch or food-improving agent. When admixed to food containing gelatinized starch immediately after the heat-gelatinization of the starch and held at relatively high temperature for a prescribed period for the saccharride permeation, the agents can inhibit starch retrogradation, hardening, or nasty-smell production of the food containing gelatinized starch occurring in distribution or storage under room temperature, refrigeration, chilling, or freezing condition. When used for noodles such as "udon" (Japanese wheat noodle), "soba" (buckwheat noodle), Chinese noodle, or spaghetti, the agents give other effects such as easy disentanglement as well as the above effect.

INDUSTRIAL APPLICABILITY

As described above, according to the present invention, a food containing gelatinized starch, of which deterioration of eating-quality characteristics are inhibited after storage under freezing, refrigerating, chilling, or room temperature, is provided by permeation of α,α-trehalose and/or maltose or the saccharide comprising them and other oligosaccharides into the food in the preparation process, which is brought by addmixing the saccharides to the food at 50 to 100° C. immediately after heat-gelatinization and holding it at a relatively high temperature for a prescribed period. The present invention makes a remarkably efficacy as describe above and have a great meaning with substantial contribution in the field.

The invention claimed is:
1. A method for producing a cooked rice, comprising the steps of:
   (a) boiling a raw rice,
   (b) keeping the resulting boiled rice to 70 to 90° C., and
   (c) adding a solution of a saccharide mixture comprising (i) maltose, (ii) α,α-trehalose, and (iii) one or more saccharides selected from the group consisting of maltotetraose containing maltooligosaccharides and α-maltosyl α,α-trehalose, said mixture being in an amount of 5 to 15% (w/w) of the weight of said raw rice, on a dry solid basis, to said boiled rice, said solution having been heated at a temperature of 70 to 90° C.,
   so that said saccharide mixture permeates into said boiled rice,
   said saccharide mixture comprising maltose and α,α-trehalose at a total content of 30 to 70% (w/w), on a dry solid basis, and the weight ratio of said maltose to said α,α-trehalose is 7:3 to 2:3,
   whereby a cooked rice, in which the retrogradation and hardening of the resulting gelatinized starch are inhibited without increasing sweetness, is produced.
2. A cooked rice prepared by the method of claim 1.
3. The method of claim 1, which further comprises, after the step (c), a step of keeping said boiled rice added with said saccharide mixture at a temperature of 70 to 90° C. for 25 minutes or more.

4. The method of claim 1 wherein at least one maltotetraose-containing oligosaccharide is a maltotetraose-rich oligosaccharide.

5. The method of claim 1 wherein (iii) comprises a maltotetraose-rich syrup.

\* \* \* \* \*